(12) United States Patent
Meyer (10) Patent No.: US 7,025,303 B2
(45) Date of Patent: Apr. 11, 2006

(54) TURNING BAR FOR CONTACTLESS GUIDANCE OF A TUBULAR FILM

(75) Inventor: Helmut Meyer, Troisdorf (DE)

(73) Assignee: Reifenhauser GmbH & Co. Maschinenfabrik, Troisdorf (DE)

( * ) Notice: Subject to any disclaimer, the term of this patent is extended or adjusted under 35 U.S.C. 154(b) by 0 days.

(21) Appl. No.: 10/869,309

(22) Filed: Jun. 16, 2004

(65) Prior Publication Data

US 2005/0017123 A1 Jan. 27, 2005

Related U.S. Application Data

(60) Provisional application No. 60/479,211, filed on Jun. 17, 2003.

(30) Foreign Application Priority Data

Jun. 17, 2003 (DE) .......................... 203 09 429 U
Sep. 27, 2003 (EP) ................................ 03021872

(51) Int. Cl.
*G03B 1/52* (2006.01)

(52) U.S. Cl. ........................ 242/615.12; 242/615.4; 226/97.3

(58) Field of Classification Search ........... 242/615.12, 242/615.11, 615.21, 615.4, 548, 548.4; 226/95, 226/97.3
See application file for complete search history.

(56) References Cited

U.S. PATENT DOCUMENTS

| 3,008,185 | A | | 11/1961 | Goldman |
| 3,097,971 | A | | 7/1963 | Carlisle et al. |
| 3,321,563 | A | | 5/1967 | Rettig et al. |
| 3,744,693 | A | * | 7/1973 | Greiner ................. 242/615.12 |
| 3,950,466 | A | | 4/1976 | Hasler |
| 4,017,575 | A | | 4/1977 | Heyer |
| 4,035,878 | A | * | 7/1977 | Cheatham ................ 242/615.4 |
| 4,176,775 | A | | 12/1979 | Brendemuehl |
| 4,218,833 | A | * | 8/1980 | Coar ............................ 34/641 |

(Continued)

FOREIGN PATENT DOCUMENTS

DE 21 56 079 C2 7/1983

(Continued)

*Primary Examiner*—Kathy Matecki
*Assistant Examiner*—E. Langdon
(74) *Attorney, Agent, or Firm*—Pauley Petersen & Erickson (57) ABSTRACT

A turning bar for contactless guidance of a tubular film web moved at a loop angle around the turning bar, including a support tube with a hollow interior, which can be connected with a compressed air source. The support tube has a plurality of air outlet openings which communicate with the interior and are spaced apart from each other, substantially over an entire width of the support tube within an angular area of the support tube corresponding to the loop angle of the tubular film web. An air-permeable microporous layer is applied to the exterior of the support tube and forms the surface of the latter, through which the compressed air exiting the air outlet openings of the support tube can flow. The compressed air exits the microporous layer as a laminar air flow, which forms a laminar air cushion between the turning bar and the tubular film web. An angular area in which the air outlet openings are formed in the support tube is increased with respect to the loop angle of the tubular film web. This invention also is for a method for contactless guidance of a tubular film web.

22 Claims, 4 Drawing Sheets

U.S. PATENT DOCUMENTS

| | | |
|---|---|---|
| 5,128,076 A | 7/1992 | Akselrod et al. |
| 5,423,468 A | 6/1995 | Liedtke |
| 5,979,731 A | 11/1999 | Long et al. |
| 6,364,247 B1 * | 4/2002 | Polkinghorne ......... 242/615.11 |
| 6,398,534 B1 | 6/2002 | Faehling et al. |
| 6,722,608 B1 * | 4/2004 | Gavit et al. ............ 242/615.12 |

FOREIGN PATENT DOCUMENTS

| | | |
|---|---|---|
| DE | 199 12 209 A1 | 9/2000 |
| EP | 0 273 739 | 7/1988 |
| EP | 1 144 292 B1 | 4/2003 |
| WO | 03/033241 A1 | 4/2003 |

* cited by examiner

TURNING BAR FOR CONTACTLESS GUIDANCE OF A TUBULAR FILM

This application claims the benefit of Provisional Application No. 60/479,211, filed Jun. 17, 2003.

BACKGROUND OF THE INVENTION

1. Field of the Invention

This invention relates to a turning bar for contactless guidance of a tubular film web moved at a loop angle around the turning bar, including a support tube with a hollow interior which can be connected with a compressed air source, wherein the support tube has a plurality of air outlet openings which communicate with the interior and are spaced apart from each other, substantially over the entire width of the support tube within an angular area of the support tube corresponding to the loop angle of the tubular film web. An air-permeable microporous layer is applied to the exterior of the support tube and forms the surface of the latter, through which the compressed air exiting the air outlet openings of the support tube can flow, wherein the compressed air exits the microporous layer as a laminar air flow, which forms a laminar air cushion between the turning bar and the tubular film web.

2. Discussion of Related Art

The extrusion of tubular film webs, made of plastic, with tubular film extrusion installations is widely known. In the known processes, thickness tolerances inevitably occur in the produced tubular film web and these tolerances are added together on the tubular film web wound into a coil and cause problems in the continued processing steps, and this addition is countered by suitable countermeasures.

Such a measure, for example known from German Patent Reference DE 21 56 079 C2, provides a so-called turning bar draw-off as the draw-off device of the tubular film extrusion installation, which has at least one turning bar which is guided, for example in a reversible manner, on a plane extending at right angles to the extrusion direction, and which continuously distributes the position of the individual thickness irregularities in the extruded tubular film web over the entire width of the latter.

Because during a turning bar draw-off the tubular film web is necessarily guided obliquely, for example differing from an angle of 90° with respect to the longitudinal axis of the turning bar, over the surface of the latter because of the reversing movement of the draw-off, the turning bars of the known draw-off device are seated, fixed in place, not rotatingly seated, in the draw-off device, which causes considerable friction between the tubular film web conducted over the surface and the fixed turning bar.

Thus, various attempts have been made to reduce this friction between the turning bar and the tubular film web conducted over it.

A turning bar is known, for example from German Patent Reference DE 199 12 209 A1 and U.S. Pat. No. 6,398,534, wherein the interior of the turning bar can be connected to a compressed air source, and air outlet openings are provided in the surface at least in the area facing the tubular film web, which communicate with the interior. The air masses exiting the air outlet openings cause an air cushion between the tubular film web moved over the surface and the turning bar, so that ideally the tubular film web slides contactless over the surface and thus the otherwise inevitably created frictional forces are eliminated.

However, it is a problem in connection with the air-charged turning bars employed up to now that the air flows must exit from the air outlet openings at a high pressure and high air speed in order to produce an even air cushion over the entire surface of the turning bar. Because areas of the surface of the turning bar between the individual air outlet openings must necessarily remain free of holes in order to assure its stability, it is thus necessary to provide the areas free of openings with air from the adjoining air outlet openings in order to achieve as evenly as possible an air cushion. In actual use, this problem could not be satisfactory solved up to now, instead it was not possible up to now to avoid scattered contact between the tubular film web and the surface of the turning bar. Thus the production of tubular film webs with a high adhesion force by the turning bar draw-off devices has not been possible so far.

An expander device is also known from European Patent Reference EP 1 144 292 B1, by which a stretching of the web of material in the transverse direction is caused with a knobbed cylinder. For the floating guidance of the web of material, the cylinder has a gas-permeable wall made of a metal-containing material with open pores, which has a mean diameter of less than 10 μm, and which is charged with a gaseous fluid.

U.S. Pat. No. 5,423,468 describes a reversing roller for imprinted substrates, onto which an air-permeable sleeve of a porous plastic material is pushed in order to create an even air cushion.

SUMMARY OF THE INVENTION

It is one object of this invention to further develop a turning bar of the known type described above but so that it assures an even and dependably contactless guidance of the tubular film web.

To attain this object, according to this invention, the angular area in which the air outlet openings in the support tube are embodied is increased with respect to the loop angle of the tubular film web.

The tubular film web is conducted around the circumference of the turning bar at a loop angle, wherein the incoming area in which the tubular film web is tangentially brought closer to the circumference of the turning bar, and the outgoing area in which the tubular film web is tangentially moved away from the surface of the turning bar, delimit the loop angle. According to the scope of this invention, with limiting the air outlet openings within the support tube to the area enclosed by the loop angle of the tubular film web, it is not always assuredly possible to prevent a contact of the tubular film web with the turning bar, particularly in the incoming and outgoing areas to and away from the surface of the turning bar. Instead, it is advantageous if the area in which the air outlet openings are arranged in the support tube and thus in which the air cushion around the surface of the turning bar is also formed is increased in comparison with the loop angle, preferably on both sides of the loop angle by angles of respectively 2° to 8°. In a preferred embodiment, for example, the loop angle of the tubular film web around the turning bar is 180°, wherein the area enlarged in contrast thereto, in which the air outlet openings are arranged in the support tube of the turning bar, comprises an angle of approximately 190°, wherein the increase by 10° in comparison with the loop angle is arranged in equal amounts in the incoming and outgoing area the tubular film web.

In one embodiment of this invention, in the areas which are enlarged with respect to the loop angle of the tubular film web in which the air outlet openings are arranged, the microporous layer has an increased air permeability with respect to the remaining areas of the turning bar, so that it is possible to provide stronger blowing against the tubular film webs and to build a stronger air cushion in order to prevent the unintentional adherence of the tubular film web to the surface of the turning bar in these areas. The fact is thus taken into consideration that in these areas enlarged with respect to the loop angle the tubular film web does not yet completely enclose the surface of the turning bar, so that air needed for forming the air cushion can escape unhindered. This escaping air is compensated by the increased porosity of the microporous layer applied to the turning bar in these areas. For example, the porosity of the microporous layer in these areas can be increased up to twofold in comparison with the remaining areas of the turning bar, for example if the mean pore size is appropriately doubled. This can be caused by a changed composition of the material forming the microporous layer in these areas during the production of the turning bar in accordance with this invention.

Accordingly, strip-shaped areas of increased porosity extending in the direction of the longitudinal axis of the turning bar are formed on the circumference of the turning bar, which are assigned to the incoming and outgoing areas of the tubular film web guided in a loop around the turning bar.

According to this invention, such a microporous air-permeable layer forming the surface of the turning bar lets the air flow conducted to the interior of the turning bar exit at the surface of the turning bar in such a finely distributed manner through the multitude of the narrowest and closely adjoining micropores, that an extraordinarily even and constant air cushion is formed, over which the tubular film webs can be assuredly guided in a contactless manner, even if the tubular film webs develop a large tendency for sticking and strong adhesive forces.

The microporous layer used for forming the surface advantageously has a thickness of 0.5 to 2.0 mm, because with these layer thicknesses the desired fine distribution of the air flow, along with simultaneous air permeability of the microporous layer, is assured.

When charged with compressed air at 0.5 to 4 bar, the turning bar in accordance with this invention advantageously has an air throughput of 0.2 l/min $dm^2$ at 0.5 bar, and up to approximately 1.6 l/min $dm^2$ at 4 bar. The charge with compressed air at such a pressure of 0.5 to 4 bar is considerably lower than with known turning bars having air outlet openings drilled into the surface, for example, and the air throughput or the amount of air used is considerably lower. This not only leads to a considerable reduction of the volume of air used in connection with the turning bar of this invention, but it is also possible to make the blowers or other needed compressed air sources of smaller dimensions, the use of energy is reduced and the noise generation when using the turning bars in accordance with this invention is considerably reduced.

The production of microporous layers of a mean pore size of approximately 5 to 100 μm required by this invention, which can be applied to the support tube for forming its surface, can be accomplished in various ways. For example, the microporous layer can be produced on the basis of a powder mixture of several components with different melting temperatures.

The microporous layer can be produced on the basis of metal and ceramic components.

The method for the contactless guidance of a tubular film web conducted in a loop angle around a turning bar is based on charging the turning bar with compressed air from a compressed air source. The compressed air exits from the turning bar through air outlet openings, and through a microporous layer applied to the turning bar, in the form of a laminar air flow while forming a laminar air cushion in an angular area of the turning bar corresponding to the loop angle of the tubular film web.

In accordance with this invention, the angular area in which the laminar air flow exits from the turning bar while forming the laminar air cushion is increased with respect to the loop angle of the tubular film web.

The method thus designed is based on the recognition that with the turning bars employed up to now which have, for example, air outlet openings arranged at defined distances from each other and provided by bores in the surface of the turning bar, the air normally exits in the form of a turbulent air flow because of the high air speed and large mass throughput required for forming the air cushion, which permits the creation of an inhomogeneous air cushion around the turning bar, so that contact between the tubular film webs and the turning bar cannot always be prevented.

This problem is overcome with the embodiment of a laminar air cushion as a result of the laminar exit of the air flow from the surface provided in accordance with this invention.

In accordance with this invention, the air flow is conducted through a microporous and air-permeable layer forming the surface of the turning bar, by which the air flow is divided into a plurality of partial laminar flows, and the partial laminar flows exit through each of the individual pores in the surface of the turning bar and form a laminar air cushion around the individual pores.

With the method of this invention, it is possible to produce a tubular film web with a high adhesion effect on the basis of composite EVA structures, composite PIB structures, and composite structures with ionomers in PE-LLD films, for example.

The dependable contactless guidance according to this invention of the tubular film web around the turning bar is based on guiding the tubular film web at a defined loop angle around the turning bar, and the air cushion between the tubular film web and the turning bar is generated near or in an area of the circumference of the turning bar, which is enclosed by an angle increased with respect to the loop angle, preferably by respectively 2° to 8° on both sides. The loop angle of the tubular film web itself, at which the tubular film web is guided in a loop around the surface of the turning bar, preferably is 170° to 190°, in particular 180°.

A laminar air cushion is generated in the area respectively increased by 2° to 8° relative to the loop angle of the tubular film web, which preferably has a greater air throughput through the surface of the turning bar than in the area of the loop angle, for stronger blowing against the tubular film web and a greater support of it.

BRIEF DESCRIPTION OF THE DRAWINGS

Further details and embodiments of this invention are explained in greater detail in view of an exemplary embodiment shown in the drawings, wherein.

DESCRIPTION OF PREFERRED EMBODIMENTS

Figure 1:
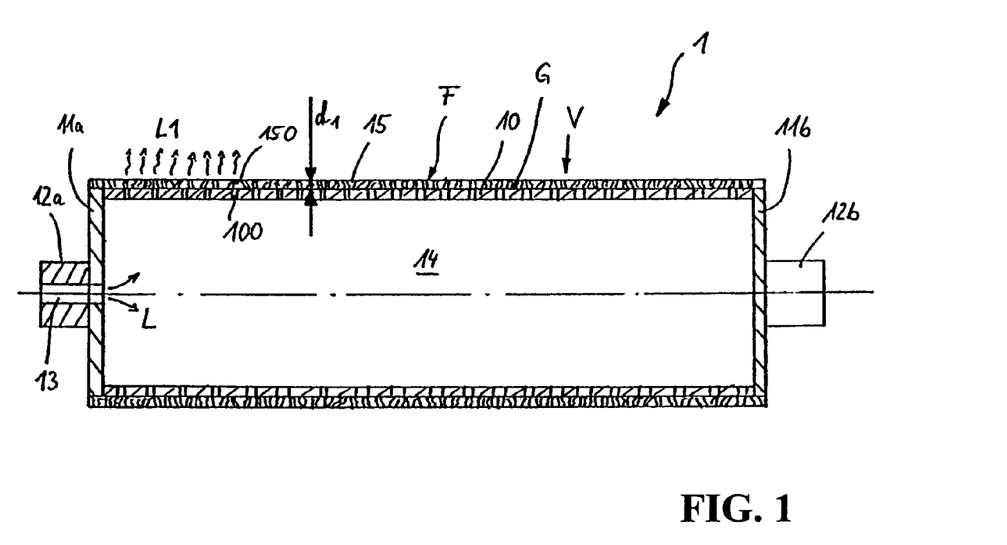
FIG. 1 is a schematic drawing of a section taken through a turning bar in accordance with this invention.

The turning bar 1 shown in FIG. 1 is intended for use in a draw-off device of a tubular film extrusion installation for the production of tubular films made of plastic. In a known manner, such as described in German Patent Reference DE 199 12 209 A1, the tubular film web is guided so that it loops around the surface F of the turning bar 1.

The turning bar 1 comprises a support tube 10 of a dimensionally stable, for example metallic, material, with circumferential face perforations 100, for example evenly cut bores, that are formed at least in the area facing the tubular film web. The support tube 10 surrounds a hollow interior 14 of the turning bar 1.

The two ends of the support tube 10 are closed by end plates 11a, 11b, which are adjoined on the outside by respective bearing journals 12a, 12b for fastening the turning bar 1 in the draw-off device. Because the tubular film web is conducted at various angles over the surface F of the turning bar 1, such turning bars 1 are customarily fastened fixed in place, for example non-rotating, in the draw-off device.

An air inlet conduit 13 is arranged passing through the bearing journal 12a, which also terminates through the adjoining front plate 11a into the hollow interior 14 of the turning bar 1. A compressed air source, for example a blower, connected to the air inlet conduit 13 can convey an air flow from there in accordance with the arrows L into the interior 14 of the turning bar 1. Then this air flow can flow off via the perforations 100 in the circumferential face of the support tube 10 to the exterior in the direction toward the tubular film web to be guided.

In one embodiment, with the turning bar 1 shown in FIG. 1 the surface F used for the guidance of the tubular film web is formed by a microporous layer 15, applied to the outside to the perforated support tube 10.

The microporous layer 15 has a thickness of 0.5 to 2.0 mm, for example, and is produced of a powder mixture of several components of different melting temperatures, for example on the basis of metal and ceramic components.

Figure 2:
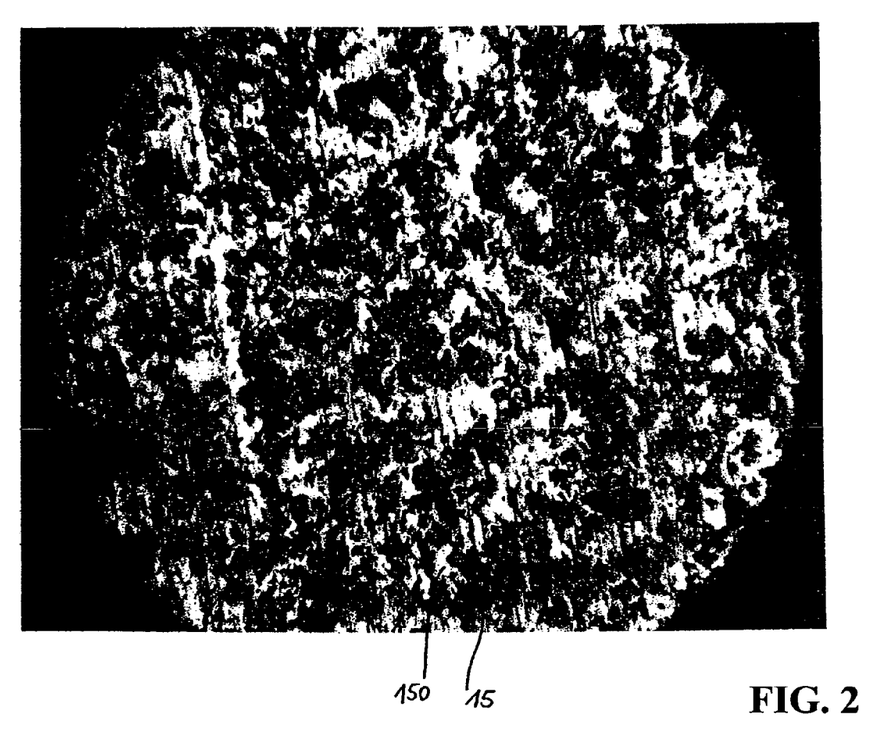
FIG. 2 is a microscopic picture of the surface of the turning bar in accordance with arrow V shown in FIG. 1.

The microporous layer 15 is distinguished because a plurality of extremely small hair fractures extend through it, as shown in the microscope representation of FIG. 2, which form air-permeable pores 150 of a pore size of approximately 5 to 100 μm in the microporous layer 15. In the representation shown in FIG. 2, it is possible to distinguish, besides the dark areas identified by the reference numeral 15, which are impermeable to air, closely adjoining irregular and light-colored micropores, which are identified by the reference numeral 150. The representation shown in FIG. 2 is provided by a microscope with 100-times magnification.

Figure 3:
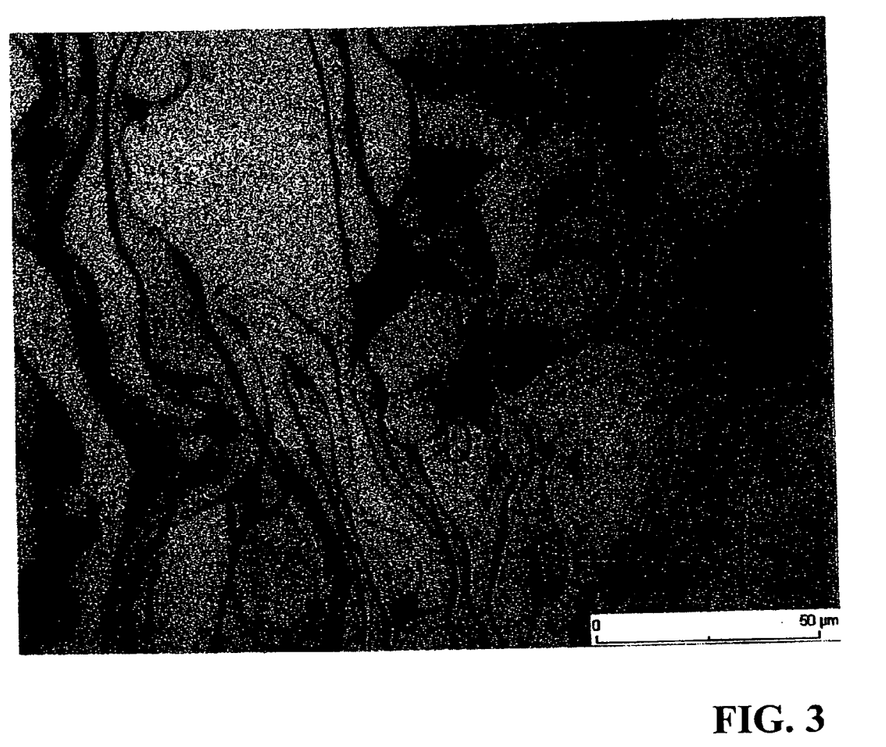
FIG. 3 is a scanning electron microscope picture of the microporous layer on the turning bar.

The irregular and dark-colored pores of approximately 5 to 100 μm can also be seen in the microporous layer of the metal substrate, which is lighter in color in comparison, in the micrograph of a scanning electron microscope shown in FIG. 3.

As also shown in FIG. 1, the air flow L conveyed by the blower into the interior 14 of the turning bar 1 via the air inlet conduit 13 is conducted through the pores 100 of the support tube 10 into the boundary layer G between the exterior surface of the support tube 10 and the microporous layer 15 applied to it, and from there through the individual irregular and closely adjoining micropores 150 to the surface F of the turning bar 1, which simultaneously represents the exterior surface of the microscopic layer 15. Then the air stream exits in the form of extremely fine micro air flows L1 from these pores 150, wherein, because of the narrow pore size of only 5 to 100 μm of the pores 150, these micro air flows L1 exit from the pores 150 at a low speed in the form of laminar air flows L1, and thus all together generate a laminar air cushion on the surface F of the turning bar 1 for the contactless guidance of the tubular film web.

In other words, the microporous layer 15 applied to the exterior of the perforated support tube 10 is used for dividing the air flow L, which is brought in at high speed through the perforations 100, into a plurality of laminar air flows L1 of the smallest size and for letting it exit from the individual finely distributed pores of a mean pore size of 5 to 100 μm, so that as a result a laminar air cushion around the surface F of the turning bar 1 is achieved.

The working range of the supplied air flow L of such a turning bar lies, depending on the conveyed product, for example the produced tubular film web, at approximately 0.5 to 4 bar. If the turning bar is charged with an air flow L of an overpressure of 0.5 bar, an air consumption of approximately 0.2 l/min dm² results, for example this amount of air exits from the turning bar 1 in the form of extremely small air flows L1. When charged with an air flow L of 4 bar overpressure, the air consumption correspondingly is approximately 1.6 l/m dm².

Such turning bars 1 can also be used for guiding strongly adhesive tubular film webs, for example composite EVA structures, composite PIB structures, and composite structures with ionomers in PE-LLD films, without their adhering to the turning bar 1.

For example, surface protection foils made of co-extruded composite EVA structures with a high VA proportion, stretched foils of co-extruded composite PE-LLD structures with PIB, or composite metallocene structures and high quality foils can be produced absolutely scratch-free and meeting very severe criteria with the draw-off device of this invention.

Because the microporous layer proposed by this invention is preferably produced on the basis of metal and ceramic components, it is possible to apply it in a simple manner by known methods to the previously produced turning bar, including the bearing journals 12a, 12b, the front plates 11a, 11b and the support tube 10, and to make it into the desired shape, for example by grinding or turning on a lathe.

Figure 4:
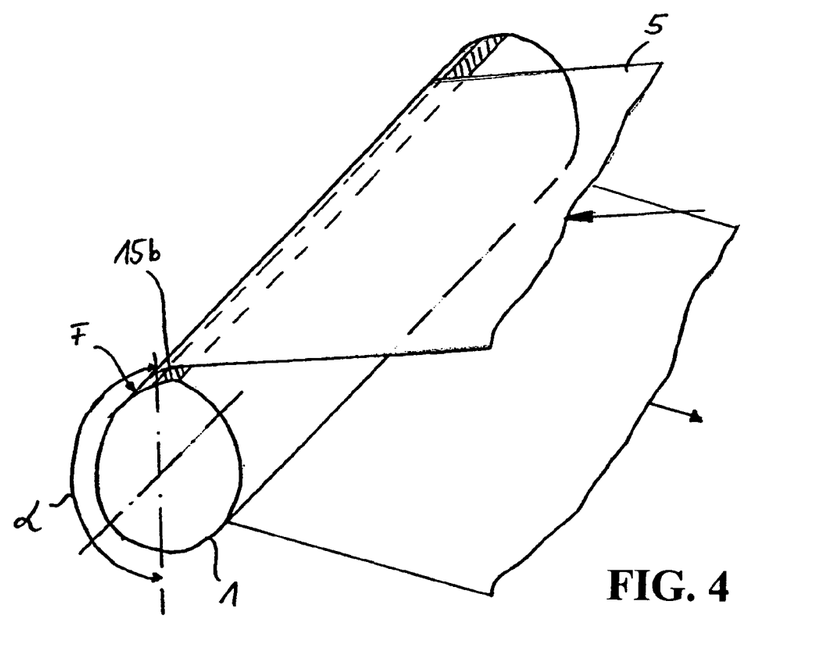
FIG. 4 is a perspective view of a turning bar around which a tubular film web is looped.
Figure 5:
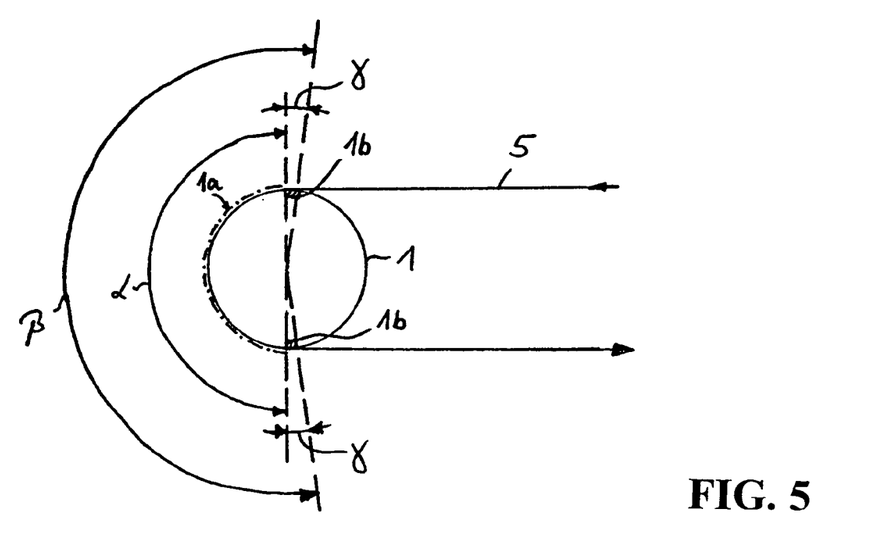
FIG. 5 is a lateral view of the turning bar as shown in FIG. 4.

For a particularly high operational dependability of the previously explained turning bar 1, it will be produced as a structure whose further details as shown in FIGS. 4 and 5.

The turning bar 1, which is used for reversing a tubular film web 5 supplied in a draw-off device in an operational process of a known turning bar draw-off is shown in FIG. 4. In this case, and as also particularly shown in FIG. 5, the tubular film web 5 is guided at a loop angle alpha around the surface F of the turning bar 1, wherein the air outlet openings 100 are also embodied in the support tube 10 in this area identified by the reference numeral 1a and visible in FIG. 1, so that the microporous layer 15, which is applied to the entire circumference of the turning bar 1 for forming the surface F, makes possible the formation of the desired laminar air cushion between the tubular film web 5 and the surface F of the turning bar 1 in this area 1a.

However, the air outlet openings 100 in the support tube 10 of the turning bar 1, and therefore the area in which the air cushion is embodied along the surface F of the turning bar 1, is not limited to the area of the surface F delimited by the loop angle alpha, but is arranged in an area greater than the loop angle alpha, which is enclosed by an angle beta. As shown in FIG. 5, this angle beta at both sides of the loop angle alpha is increased by angles gamma of equal size, which are preferably 2° to 8° each. In the embodiment shown in FIG. 5, a loop angle alpha of the tubular film web 5 around the turning bar 1 of 180° is selected, while the angle beta is approximately 190°, and the angles gamma accordingly are 5° each.

In these areas enclosed by the angles gamma, the so-called run-up or run-off area of the tubular film web 5 toward the turning bar 1, or away from it, is formed, in which the tubular film web 5 is tangentially brought in to, or away from, the surface of the turning bar 1.

In these areas, identified by the reference numeral 1b in FIG. 5, which correspond to the incoming or outgoing area of the tubular film web 5, the microporous air-permeable layer 15 on the surface F of the turning bar 1 is formed in strips of such a microporous layer 15b which has, in comparison with the microporous air-permeable layer 15, an increased air permeability, for example because of increased porosity. Accordingly, strip-shaped areas extending in the direction of the longitudinal axis of the turning bar 1 are formed, in which the microporous layer 15b of increased air permeability is arranged and which are delimited by the loop angle gamma. As a result of the increased air permeability of the microporous layer 15b, a stronger air blow is directed onto the tubular film web and a correspondingly stronger air cushion is created in order to prevent inadvertent adhesion of the tubular film web 5 to these incoming and outgoing areas of the turning bar 1. Air losses because of the tubular film web 5 not yet enclosing the circumference of the turning bar 1 in the incoming and outgoing areas are thus compensated. The turning bar 1 provides a substantially improved operational dependability and assures a reliable guidance around the turning bar 1 which is contactless, and therefore free of markings, even in case of strongly adhesive and sticky films.

The above described turning bar is primarily intended for the stated use within a so-called turning bar draw-off device of a tubular film extrusion installation. However, it is understood by a person skilled in the art that a bar or roller thus embodied is also suited for other applications in which as contactless as possible a guidance and/or reversal of a web-shaped plastic product is to be achieved. Examples of this include guidance and reversing rollers in chill roll film extrusion installations, as well as extrusion installations for the production of spinbonded or melt-blown non-woven webs and the like.

German Patent Reference DE 203 09 429.8 and European Patent Reference EP 03021872.1, the priority documents corresponding to this invention, and their teachings are incorporated, by reference, into this specification.

What is claimed is:

1. A turning bar for contactless guidance of a tubular film web (5) moved at a loop angle around the turning bar (1), the turning bar comprising:
   a support tube (10) having a hollow interior (14) connectible with a compressed air source, the support tube (10) having a plurality of air outlet openings (100) communicating with the interior (14) and spaced apart from each other substantially over an entire width of the support tube (10) within an angular area of the support tube (10) corresponding to the loop angle of the tubular film web (5);
   an air-permeable microporous layer (15) applied to the exterior of the support tube (10) and forming a surface (F) of the support tube (10) through which the compressed air exiting the air outlet openings (100) of the support tube (10) flows, the compressed air exiting the microporous layer (15) as a laminar air flow forming a laminar air cushion between the turning bar (1) and the tubular film web (15); and
   the angular area in which the air outlet openings (100) are formed in the support tube (10) is increased with respect to the loop angle of the tubular foil web (5), and the microporous layer (15) applied to strip shaped areas of the angular area which are increased with respect to the loop angle of the tubular film web (5) having an increased air permeability with respect to the air-permeable microporous layer (15) applied to the remaining areas of the support tube (10).

2. The turning bar in accordance with claim 1, wherein the angular area in which the air outlet openings (100) are embodied in the support tube (10) is increased on both sides by equal angles with respect to the loop angle of the tubular foil web (5).

3. The turning bar in accordance with claim 2, wherein the loop angle is increased in angles of equal size between 2° and 8°.

4. The turning bar in accordance with claim 3, wherein the loop angle of the tubular film web (5) around the turning bar (1) is between 170° and 190°.

5. The turning bar in accordance with claim 4, wherein the air-permeable microporous layer (15) has a mean pore size of 5 to 100 μm.

6. The turning bar in accordance with claim 5, wherein the air-permeable microporous layer (15) of the turning bar (1) has a mean thickness of 0.5 to 2.0 mm.

7. The turning bar in accordance with claim 6, wherein the turning bar has an air throughput corresponding to 0.2 l/mm dm$^2$ at 0.5 bar, and at 4 bar to 1.6 l/mm dm$^2$, when charged with compressed air at 0.5 to 4 bar.

8. The turning bar in accordance with claim 7, wherein the microporous layer (15) of the turning bar (1) is produced of a powder mixture of a plurality of components having different melting temperatures.

9. The turning bar in accordance with claim 8, wherein the microporous layer (15) of the turning bar (1) is produced of metal and ceramic components.

10. The turning bar in accordance with claim 1, wherein the loop angle of the tubular film web (5) around the turning bar (1) is between 170° and 190°.

11. The turning bar in accordance with claim 1, wherein the air-permeable microporous layer (15) has a mean pore size of 5 to 100 μm.

12. The turning bar in accordance with claim 1, wherein the air-permeable microporous layer (15) of the turning bar (1) has a mean thickness of 0.5 to 2.0 mm.

13. The turning bar in accordance with claim 1, wherein the turning bar has an air throughput corresponding to 0.2 l/mm dm$^2$ at 0.5 bar, and at 4 bar to 1.6 l/mm dm$^2$, when charged with compressed air at 0.5 to 4 bar.

14. The turning bar in accordance with claim 1, wherein the microporous layer (15) of the turning bar (1) is produced of a powder mixture of a plurality of components having different melting temperatures.

15. A method for contactless guidance of a tubular film web (5) moved at a loop angle around a turning bar (1), wherein the turning bar (1) is charged with compressed air from a compressed air source which exits, in an angular area of the turning bar (1) corresponding to the loop angle of the tubular film web (5) via air outlet openings (100) and a microporous layer (15) applied to the turning bar (1), as a laminar air flow to form a laminar air cushion, the method comprising: increasing the angular area in which the laminar air flow exits from the turning bar (1) while forming the laminar air cushion with respect to the loop angle of the tubular film web (5), the angular area at which the laminar air flow exits the turning bar (1) while forming an air cushion being increased on both sides by identical angles with respect to the loop angle of the tubular film web (5), the loop angle being increased in angles of equal size between 2° and 8°, and in a strip-shaped area of the angular area which is increased with respect to the loop angle of the tubular film web (5) around the turning bar (1), and in which the laminar air flow exits from the turning bar (1) while forming a laminar air cushion, the laminar air cushion with a greater air flow through the turning bar (1) than in the area of the loop angle being created.

16. The method in accordance with claim 15, wherein the loop angle of the tubular film web (5) around the turning bar (1) is between 170° and 190°.

17. The method in accordance with claim 16, wherein the compressed air is conducted through pores (150) of the microporous layer (15) forming the surface (F) of the turning bar (1) in a direction toward the tubular film web (5), and the air flow is divided into a plurality of partial laminar air flows (L1), which exit from the pores (150) while forming the laminar air cushion.

18. The method in accordance with claim 17, wherein the tubular film web (5) with strong adhesion effects are produced on the basis of composite EVA structures, composite PIB structures, and composite structures with ionomers in PE-LLD films.

19. The method in accordance with claim 15, wherein in a strip-shaped area of the angular area which is increased with respect to the loop angle of the tubular film web (5) around the turning bar (1), and in which the laminar air flow exits from the turning bar (1) while forming a laminar air cushion, the laminar air cushion with a greater air flow through the turning bar (1) than in the area of the loop angle is created.

20. The method in accordance with claim 15, wherein the loop angle of the tubular film web (5) around the turning bar (1) is between 170° and 190°.

21. The method in accordance with claim 15, wherein the compressed air is conducted through pores (150) of the microporous layer (15) forming the surface (F) of the turning bar (1) in a direction toward the tubular film web (5), and the air flow is divided into a plurality of partial laminar air flows (L1), which exit from the pores (150) while forming the laminar air cushion.

22. The method in accordance with claim 15, wherein the tubular film web (5) with strong adhesion effects are produced on the basis of composite EVA structures, composite PIB structures, and composite structures with ionomers in PE-LLD films.

* * * * *